US009940883B2

(12) United States Patent
Han et al.

(10) Patent No.: US 9,940,883 B2
(45) Date of Patent: Apr. 10, 2018

(54) DISPLAY PANEL INSPECTION APPARATUS

(71) Applicant: SAMSUNG DISPLAY CO., LTD., Yongin-si, Gyeonggi-do (KR)

(72) Inventors: Jung-Suk Han, Hwaseong-si (KR); Hoi-Sik Moon, Asan-si (KR); Jong-Hee Na, Asan-si (KR); Jun-Il Park, Cheonan-si (KR); Hyung-Woo Yim, Goyang-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 136 days.

(21) Appl. No.: 14/993,261

(22) Filed: Jan. 12, 2016

(65) Prior Publication Data

US 2016/0379577 A1 Dec. 29, 2016

(30) Foreign Application Priority Data

Jun. 29, 2015 (KR) ........................ 10-2015-0092421

(51) Int. Cl.
*G06F 3/01* (2006.01)
*G09G 3/36* (2006.01)
*G09G 3/00* (2006.01)

(52) U.S. Cl.
CPC ........... *G09G 3/3607* (2013.01); *G09G 3/006* (2013.01); *G09G 2320/0242* (2013.01); *G09G 2320/0693* (2013.01)

(58) Field of Classification Search
CPC ................. G09G 3/3607; G09G 3/006; G09G 2320/0242; G09G 2320/0693; G09G 2340/06; G01J 3/506
See application file for complete search history.

(56) References Cited

U.S. PATENT DOCUMENTS

2003/0147053 A1* 8/2003 Matsuda ................ G09G 1/285 353/31
2011/0221760 A1* 9/2011 Irie ...................... G09G 3/3648 345/589
2013/0155121 A1* 6/2013 Kang ....................... H04N 9/73 345/690
2014/0225940 A1* 8/2014 Nakagawa ........... G09G 3/3607 345/690

FOREIGN PATENT DOCUMENTS

| | | |
|---|---|---|
| JP | 2001-357394 | 12/2001 |
| JP | 2009-186284 | 8/2009 |
| KR | 1020020024668 | 4/2002 |
| KR | 1020160011300 | 2/2016 |

* cited by examiner

*Primary Examiner* — Abbas Abdulselam
(74) *Attorney, Agent, or Firm* — F. Chau & Associates, LLC

(57) ABSTRACT

A vision inspection apparatus includes a tri-stimulus measuring part configured to measure gray tri-stimulus values of a sample grayscale and color tri-stimulus values of a full-grayscale, a color tri-stimulus generating part configured to generate color tri-stimulus values of the sample grayscale using the gray tri-stimulus values of the sample grayscale and the color tri-stimulus values of the full-grayscale, and a color correction value generating part configured to generate color grayscale correction value using the gray tri-stimulus values of the sample grayscale and the color tri-stimulus values of the sample grayscale.

14 Claims, 8 Drawing Sheets

<GENERATING TARGET CURVES OF TRI-STIMULUS VALUES>

< CALCULATING RGB GRAYSCALE DIFFERENCES >

DISPLAY PANEL INSPECTION APPARATUS

CROSS REFERENCE TO RELATED APPLICATION

This application claims priority under 35 U.S.C. § 119 to, and the benefit of, Korean Patent Application No. 10-2015-0092421, filed on Jun. 29, 2015 in the Korean Intellectual Property Office, the disclosure of which is hereby incorporated by reference for all purposes as if fully set forth herein.

TECHNICAL FIELD

Exemplary embodiments of the inventive concept relate to a display panel inspection apparatus and a method of driving the inspection apparatus. More particularly, exemplary embodiments relate to an inspection apparatus for compensating a Mura defect of pixels or sub-pixels, and a method of driving the inspection apparatus.

DISCUSSION OF RELATED ART

In general, a liquid crystal display ("LCD") panel may include a lower substrate, an upper substrate opposite to the lower substrate, and a liquid crystal ("LC") layer disposed between the upper substrate and the lower substrate. The lower substrate may include a pixel area defining a pixel and a peripheral area for receiving a driving signal to be applied to the pixel.

A data line, a gate line and a pixel electrode may be disposed in the pixel area. The data line may extend in a first direction, the gate line may extend in a second direction crossing the first direction, and the pixel electrode may be connected to the data line and the gate line. A first driving chip pad and a second driving chip pad may be disposed in the peripheral area. The first driving chip pad may receive a data signal and the second driving chip pad may receive a gate signal.

The LCD panel, with the LC layer disposed between the upper substrate and the lower substrate, may be tested through a visual test process for testing electrical and optical operations of the LC panel. In general, the visual test process includes testing various kinds of Mura defects (e.g., spot and line Mura defects) in reliance upon a human tester's vision, and removing the Mura defects using a Mura defect removal algorithm based on a test result. Correction data generated through the Mura defect removal algorithm may be stored at a memory in a display apparatus, and then the display apparatus may correct input data using the correction data to compensate the Mura defect.

SUMMARY

Exemplary embodiments of the inventive concept provide a vision inspection apparatus for low inspection processing time and compensating a colored mura defect. Exemplary embodiments of the inventive concept provide a method of driving the vision inspection apparatus.

According to an exemplary embodiment of the inventive concept, a vision inspection apparatus is provided. The vision inspection apparatus includes a tri-stimulus measuring part configured to measure gray tri-stimulus values of a sample grayscale and color tri-stimulus values of a full-grayscale, a color tri-stimulus generating part configured to generate color tri-stimulus values of the sample grayscale using the gray tri-stimulus values of the sample grayscale and the color tri-stimulus values of the full-grayscale, and a color correction value generating part configured to generate color grayscale correction value using the gray tri-stimulus values of the sample grayscale and the color tri-stimulus values of the sample grayscale.

In an exemplary embodiment, the color tri-stimulus generating part may be configured to calculate a color coordinate corresponding to the sample grayscale using a representative function of differences between a color coordinate corresponding to the full-grayscale and the color coordinate corresponding to the sample grayscale with respect to a transmittance of a display panel.

In an exemplary embodiment, the color tri-stimulus generating part may be configured to calculate a color luminance value corresponding to the sample grayscale using a relational equation of the color tri-stimulus values and the color coordinate corresponding to the sample grayscale.

In an exemplary embodiment, the color tri-stimulus generating part may be configured to generate the color tri-stimulus values corresponding to the sample grayscale using the color coordinate and the color luminance value corresponding to the sample grayscale.

In an exemplary embodiment, a red color coordinate (xRed_n, yRed_n) corresponding to the sample grayscale, a green color coordinate (xGreen_n, yGreen_n) corresponding to the sample grayscale and a blue color coordinate (xBlue_n, yBlue_n) corresponding to the sample grayscale may be defined as follows:

$$x_{Red\_n}=x_{Red\_255}-(x_{Red\_255}-x_{Red\_n})$$

$$y_{Red\_n}=y_{Red\_255}-(y_{Red\_255}-y_{Red\_n})$$

$$x_{Green\_n}=x_{Green\_255}-(x_{Green\_255}-x_{Green\_n})$$

$$y_{Green\_n}=y_{Green\_255}-(y_{Green\_255}-y_{Green\_n})$$

$$x_{Blue\_n}=x_{Blue\_255}-(x_{Blue\_255}-x_{Blue\_n})$$

$$y_{Blue\_n}=y_{Blue\_255}-(y_{Blue\_255}-y_{Blue\_n})$$

wherein, $(x_{Red\_255}-x_{Red\_n})$, $(y_{Red\_255}-y_{Red\_n})$, $(x_{Green\_255}-x_{Green\_n})$, $(y_{Green\_255}-y_{Green\_n})$, $(x_{Blue\_255}-x_{Blue\_n})$ and $(y_{Blue\_255}-y_{Blue\_n})$ and may be calculated by the representative function, and a red color coordinate (xRed_255, yRed_255) corresponding to the full-grayscale, a green color coordinate (xGreen_255, yGreen_255) corresponding to the full-grayscale, and a blue color coordinate (xBlue_255, yBlue_255) corresponding to the full-grayscale may be defined by the following relational equation with respect to tri-stimulus values X, Y and Z and color coordinates x and y;

$$X = \frac{X}{Y} \times Y = \frac{x}{y} \times Y \;\; Z = \frac{Z}{Y} \times Y = \frac{z}{y} \times Y.$$

In an exemplary embodiment, red, green and blue luminance values (YRed_n, YGren_n, YBlue_n) corresponding to the sample grayscale may be defined per the following Equations:

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}$$

-continued $$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix}$$

wherein, XGray_n, YGray_n and ZGray_n may be the gray tri-stimulus values corresponding to the sample grayscale.

In an exemplary embodiment, the vision inspection apparatus may further include a target tri-stimulus generating part configured to generate target-gray tri-stimulus values of the sample grayscale using the gray tri-stimulus values of the sample grayscale, wherein the color correction value generating part may be configured to generate the color grayscale correction value of the sample grayscale using the target-gray tri-stimulus values, the gray tri-stimulus values and the color tri-stimulus values corresponding to the sample grayscale.

According to an exemplary embodiment of the inventive concept, a method of driving the vision inspection apparatus is provided. The method includes measuring gray tri-stimulus values of a sample grayscale and color tri-stimulus values of a full-grayscale, generating color tri-stimulus values of the sample grayscale using the gray tri-stimulus values of the sample grayscale and the color tri-stimulus values of the full-grayscale, and calculating color grayscale correction value using the gray tri-stimulus values of the sample grayscale and the color tri-stimulus values of the sample grayscale.

In an exemplary embodiment, the generating color tri-stimulus values may includes calculating a color coordinate corresponding to the sample grayscale using a representative function of differences between a color coordinate corresponding to the full-grayscale and the color coordinate corresponding to the sample grayscale with respect to a transmittance of a display panel.

In an exemplary embodiment, the method may further include calculating a color luminance value corresponding to the sample grayscale using a relational equation of the color tri-stimulus values and the color coordinate corresponding to the sample grayscale.

In an exemplary embodiment, the method may further include generating the color tri-stimulus values corresponding to the sample grayscale using the color coordinate and the color luminance value corresponding to the sample grayscale.

In an exemplary embodiment, a red color coordinate (xRed_n, yRed_n) corresponding to the sample grayscale, a green color coordinate (xGreen_n, yGreen_n) corresponding to the sample grayscale and a blue color coordinate (xBlue_n, yBlue_n) corresponding to the sample grayscale may be defined as follows:

$$x_{Red\_n}=x_{Red\_255}-(x_{Red\_255}-x_{Red\_n})$$

$$y_{Red\_n}=y_{Red\_255}-(y_{Red\_255}-y_{Red\_n})$$

$$x_{Green\_n}=x_{Green\_255}-(x_{Green\_255}-x_{Green\_n})$$

$$y_{Green\_n}=y_{Green\_255}-(y_{Green\_255}-y_{Green\_n})$$

$$x_{Blue\_n}=x_{Blue\_255}-(x_{Blue\_255}-x_{Blue\_n})$$

$$y_{Blue\_n}=y_{Blue\_255}-(y_{Blue\_255}-y_{Blue\_n})$$

wherein, $(x_{Red\_255}-x_{Red\_n})$, $(y_{Red\_255}-y_{Red\_n})$, $(x_{Green\_255}-x_{Green\_n})$, $(y_{Green\_255}-y_{Green\_n})$ $(x_{Blue\_255}-x_{Blue\_n})$ and $(y_{Blue\_255}-y_{Blue\_n})$ may be calculated by the representative function, and a red color coordinate (xRed_255, yRed_255) corresponding to the full-grayscale, a green color coordinate (xGreen_255, yGreen_255) corresponding to the full-grayscale, and a blue color coordinate (xBlue_255, yBlue_255) corresponding to the full-grayscale may be defined by the following relational equation with respect to tri-stimulus values X, Y and Z and color coordinates x and y;

$$X = \frac{X}{Y} \times Y = \frac{x}{y} \times Y \quad Z = \frac{Z}{Y} \times Y = \frac{z}{y} \times Y.$$

In an exemplary embodiment, red, green and blue luminance values (YRed_n, YGren_n, YBlue_n) corresponding to the sample grayscale may be defined per the following Equations:

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix} \begin{bmatrix} Y_{Red\_n} \\ Y_{Green\_n} \\ Y_{Blue\_n} \end{bmatrix}$$

$$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix}$$

wherein XGray_n, YGray_n and ZGray_n may be the gray tri-stimulus values corresponding to the sample grayscale.

In an exemplary embodiment, the method may further include generating target-gray tri-stimulus values of the sample grayscale using the gray tri-stimulus values of the sample grayscale, wherein the color correction value generating part may be configured to generate the color grayscale correction value of the sample grayscale using the target-gray tri-stimulus values, the gray tri-stimulus values and the color tri-stimulus values corresponding to the sample grayscale.

An exemplary embodiment software product for use in a display device having a processor, a memory, and a display panel, is provided, the software product comprising computer executable instructions that, when executed by the processor, cause the device to: measure gray tri-stimulus values of a sample grayscale and color tri-stimulus values of a full-grayscale; generate color tri-stimulus values of the sample grayscale based on the gray tri-stimulus values of the sample grayscale and the color tri-stimulus values of the full-grayscale; and calculate a color grayscale correction value based on the gray tri-stimulus values of the sample grayscale and the color tri-stimulus values of the sample grayscale.

According to exemplary embodiments of the inventive concept, the red, green and blue tri-stimulus values of the sample grayscale may be calculated by the RGB algorithm and need not be generated by a visual measurement processes. Thus, inspection processing time for compensating colored mura defects may be low.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Hereinafter, the inventive concept will be explained in detail with reference to exemplary embodiments thereof as illustrated in the accompanying drawings.

Figure 1:
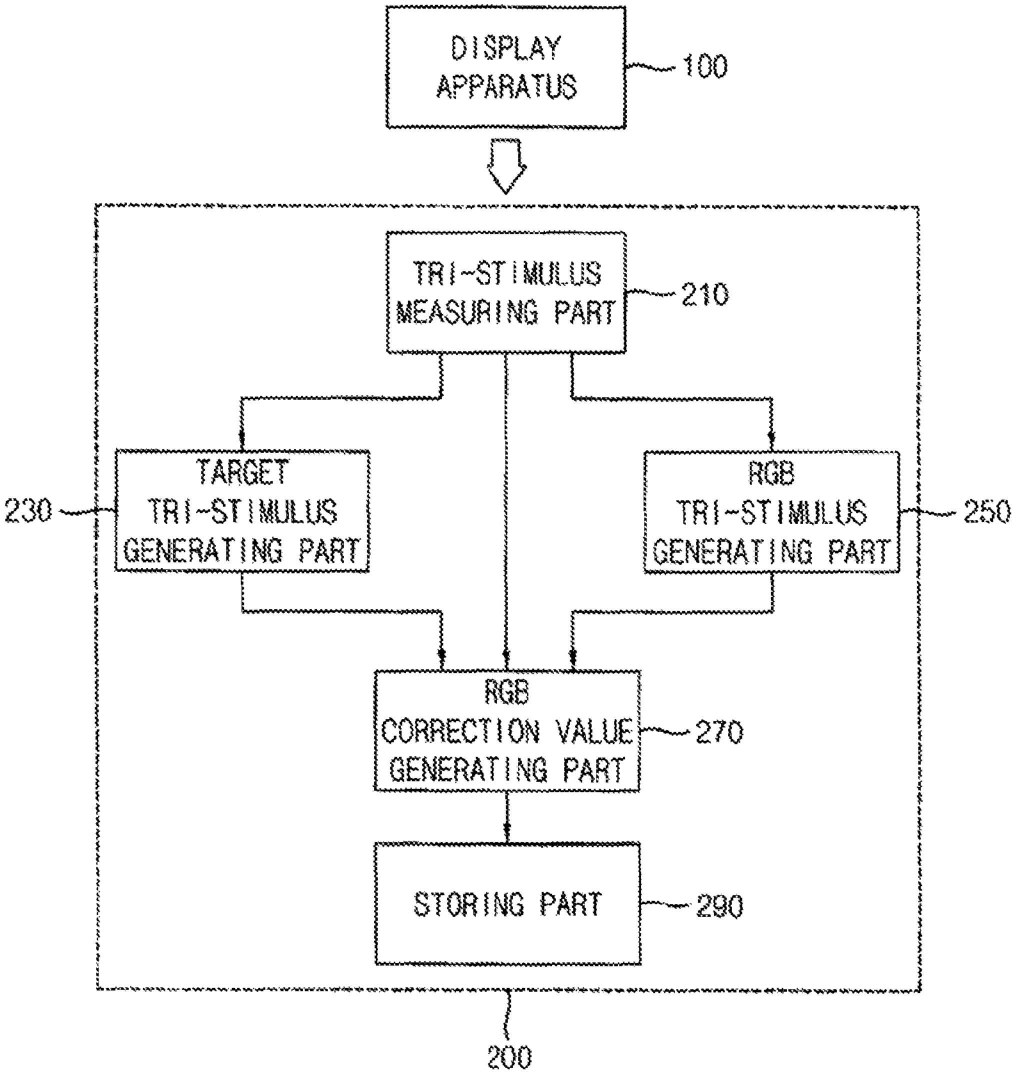
FIG. 1 is a schematic block diagram illustrating a vision inspection apparatus according to an exemplary embodiment.

FIG. 1 is a block diagram illustrating a vision inspection apparatus according to an exemplary embodiment.

Referring to FIG. 1, the vision inspection apparatus 200 may include a tri-stimulus measuring part 210, a target tri-stimulus generating part 230 coupled to the tri-stimulus measuring part, an RGB tri-stimulus generating part 250 coupled to the tri-stimulus measuring part, an RGB correction value generating part 270 coupled to each of the tri-stimulus measuring part 210, the target tri-stimulus generating part 230 and the RGB tri-stimulus generating part 250, and a storing part 290 coupled to the RGB correction value generating part 270.

The tri-stimulus measuring part 210 may be configured to capture a sample image having a sample grayscale displayed on a display apparatus 100 and to measure tri-stimulus values of a pixel image displayed on a reference pixel in the display apparatus.

For example, when total grayscales may be referred to as a range of about 0-grayscale to about 255-grayscale, the tri-stimulus measuring part 210 according to an exemplary embodiment may be configured to display a plurality of sample grayscale images corresponding to a plurality of sample grayscales sampled from total grayscales. In addition, the tri-stimulus measuring part 210 may be configured to display full-grayscale color images that may include a red image, a green image and a blue image of the 255-grayscale on the display apparatus 100. The plurality of sample grayscales may include a 255-grayscale, a 128-grayscale, a 32-grayscale, a 16-grayscale, an 8-grayscale, a 4-grayscale, a 2-grayscale and 0-grayscale among the total 255 grayscales, for example, but not limited thereto.

The tri-stimulus measuring part 210 may be configured to measure gray tri-stimulus values of the sample grayscale corresponding to the reference pixel from a gray image displayed on the display apparatus 100. The reference pixel includes a red sub-pixel, a green sub-pixel and a blue sub-pixel. The gray image of the sample grayscale includes a red image having the sample grayscale displayed on the red sub-pixel, a green image having the sample grayscale displayed on the green sub-pixel, and a blue image having the sample grayscale displayed on the blue sub-pixel. The tri-stimulus measuring part 210 may be configured to measure red tri-stimulus values of the full-grayscale corresponding to the red sub-pixel of the reference pixel from a red image of the full-grayscale displayed on only red sub-pixels in the display apparatus 100. The tri-stimulus measuring part 210 may be configured to measure green tri-stimulus values of the full-grayscale corresponding to the green sub-pixel of the reference pixel from a green image of the full-grayscale displayed on only green sub-pixels in the display apparatus 100. The tri-stimulus measuring part 210 may be configured to measure blue tri-stimulus values of the full-grayscale corresponding to the blue sub-pixel of the reference pixel from a blue image of the full-grayscale displayed on only blue sub-pixels in the display apparatus 100.

For example, the display apparatus may include a plurality of pixels arranged in an (N×M) matrix. Each of the plurality of pixels may include a red sub-pixel, a green sub-pixel and a blue sub-pixel. The reference pixel may be preset corresponding to each of the N×M pixels arranged in the (N×M) matrix, or each of (p×q) pixels arranged in a (p×q) matrix reconstituted from the (N×M) matrix (N, M, p and q are natural numbers, wherein N>p and M>q).

The target tri-stimulus generating part 230 may be configured to generate target-gray tri-stimulus values of the sample grayscale using the gray tri-stimulus values of the sample grayscale corresponding to the reference pixel measured from the tri-stimulus measuring part 210.

The RGB tri-stimulus generating part 250 may be configured to generate red, green and blue tri-stimulus values of the sample grayscale corresponding to the reference pixel using the red, green and blue tri-stimulus values of the full-grayscale, and gray tri-stimulus values of the sample grayscale corresponding to the reference pixel.

The RGB tri-stimulus generating part 250 may be configured to calculate red, green and blue tri-stimulus values of the sample grayscale using an RGB algorithm for generating red, green and blue grayscales based on characteristics of the LCD panel.

The RGB algorithm may be configured to calculate color coordinates of red, green and blue corresponding to the sample grayscale using a representative function of differences between color coordinates of red, green and blue corresponding to the full-grayscale and color coordinates of red, green and blue corresponding to the sample grayscale with respect to a transmittance of the LCD panel. Generally, in International Commission on Illumination ("CIE") 1931 color space, tri-stimulus values X, Y and Z may be changed into color coordinates x and y and a luminance value Y, and thus red, green and blue color luminance values of the sample grayscale may be calculated. Thus, the red, green and blue tri-stimulus values may be calculated using the red, green and blue color coordinates of the sample grayscale and the red, green and blue luminance values.

The RGB correction value generating part 270 may be configured to calculate red, green and blue grayscale correction values of the sample grayscale using the target-gray tri-stimulus values, the gray tri-stimulus values, the red tri-stimulus values, the green tri-stimulus values and the blue tri-stimulus values corresponding to the sample grayscale.

The storing part 290 may be configured to store red, green and blue grayscale correction values of the sample grayscale calculated from the RGB correction value generating part 270. The storing part 290 may be mounted in the display apparatus 100 when the inspection processes is finished. The red, green and blue grayscale correction values stored in the storing part 290 may be used for correcting red, green and blue data as display data of the display apparatus 100.

According to an exemplary embodiment, the red, green and blue tri-stimulus values of the sample grayscale are calculated by the RGB algorithm and need not be generated by a measurement processes. Thus, inspection processing times for compensating colored mura defects may be low.

Figure 2:
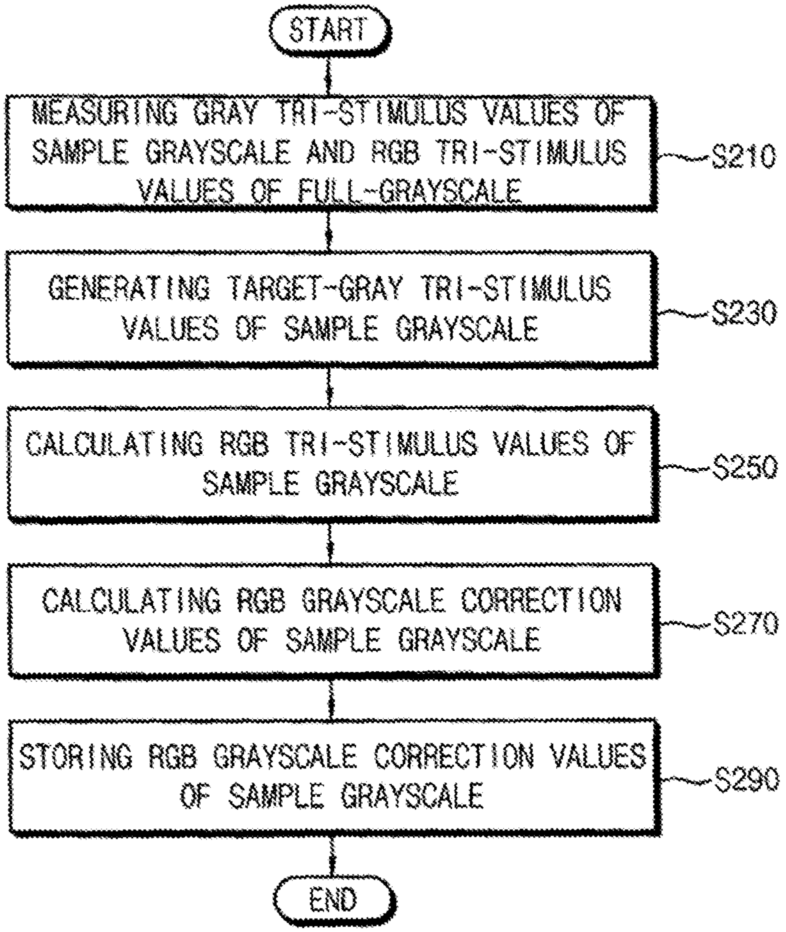
FIG. 2 is a schematic flowchart diagram illustrating a method of driving the vision inspection apparatus of FIG. 1.
Figure 3A:
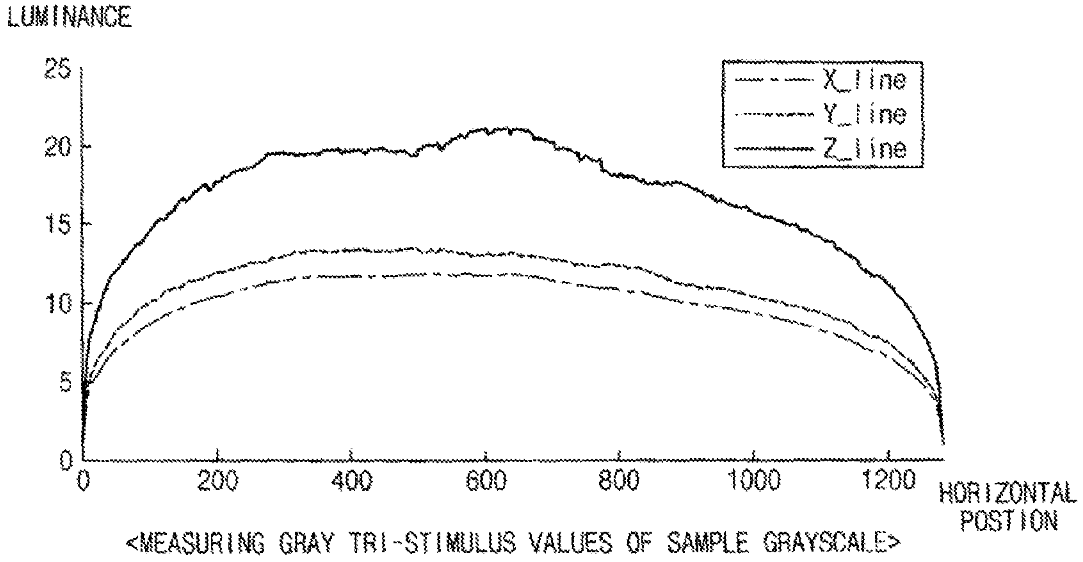
FIGS. 3A and 3B are conceptual graphical diagrams illustrating data from a target tri-stimulus generating part of FIG. 1.
Figure 3B:
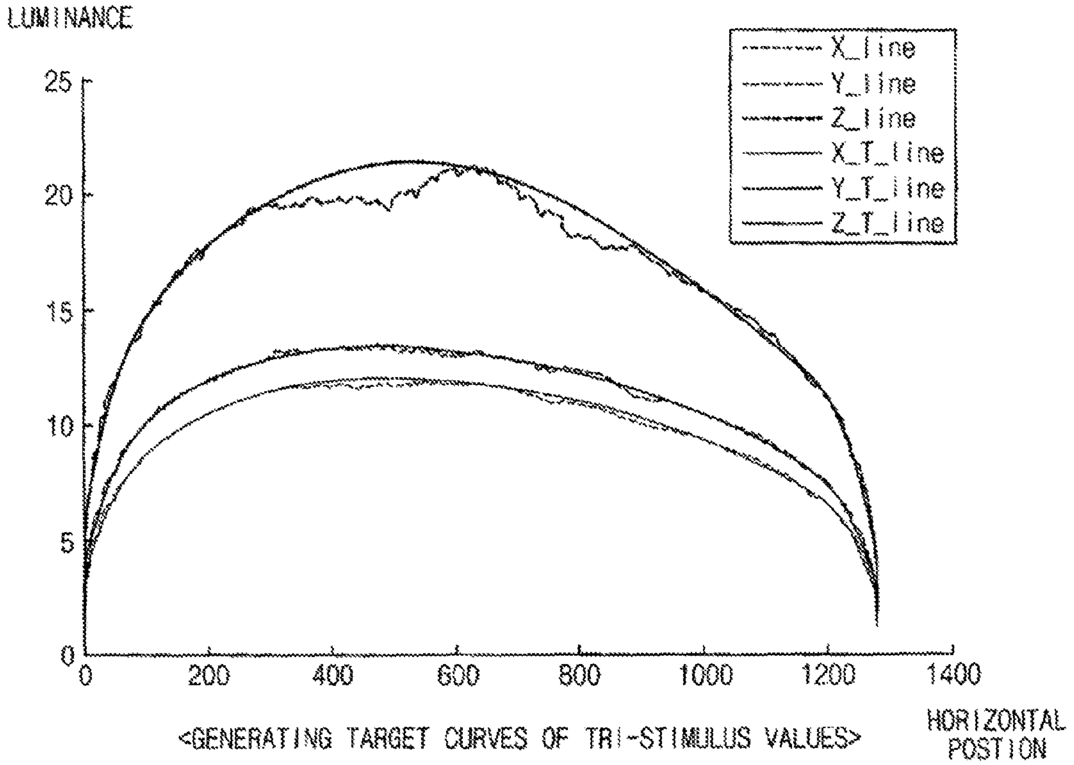
Figure 4A:
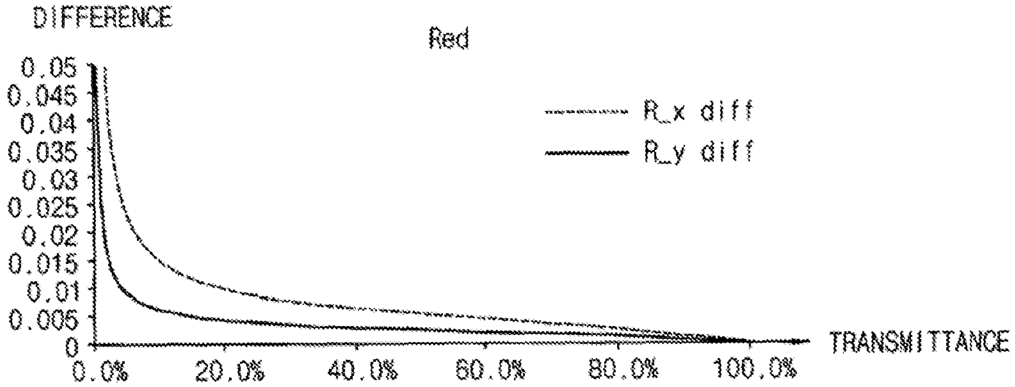
FIGS. 4A to 4C are conceptual graphical diagrams illustrating data from a tri-stimulus generating part of FIG. 1.
Figure 4B:
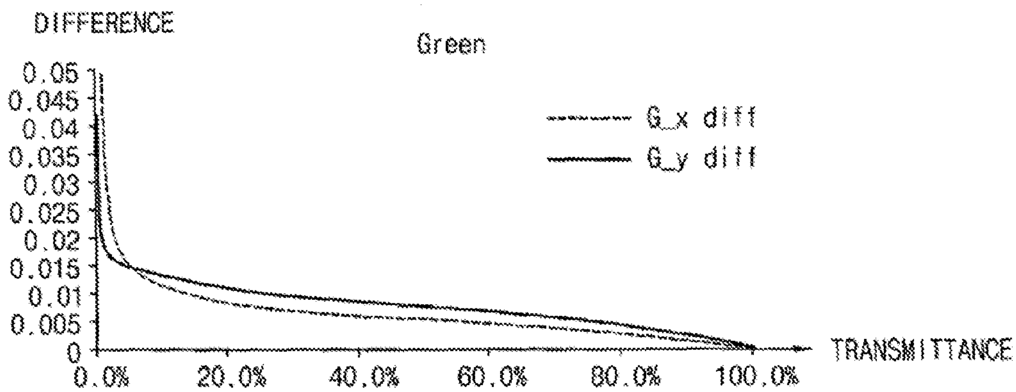
Figure 4C:
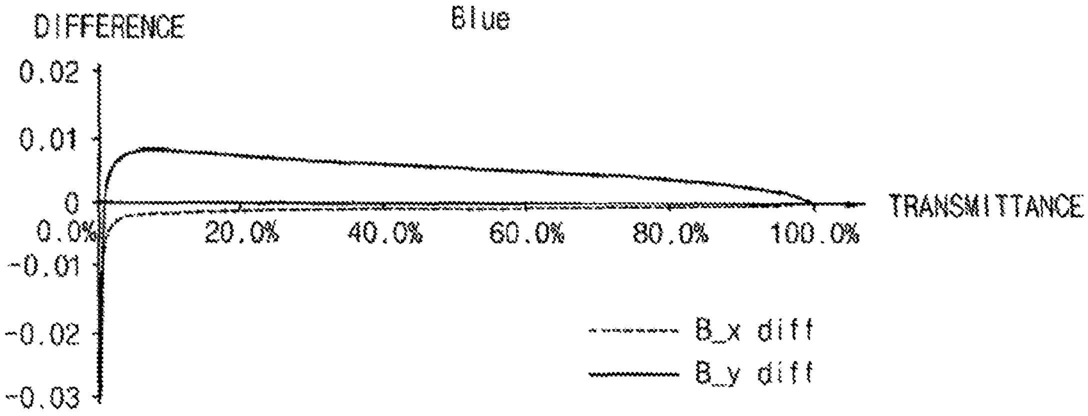
Figure 5A:
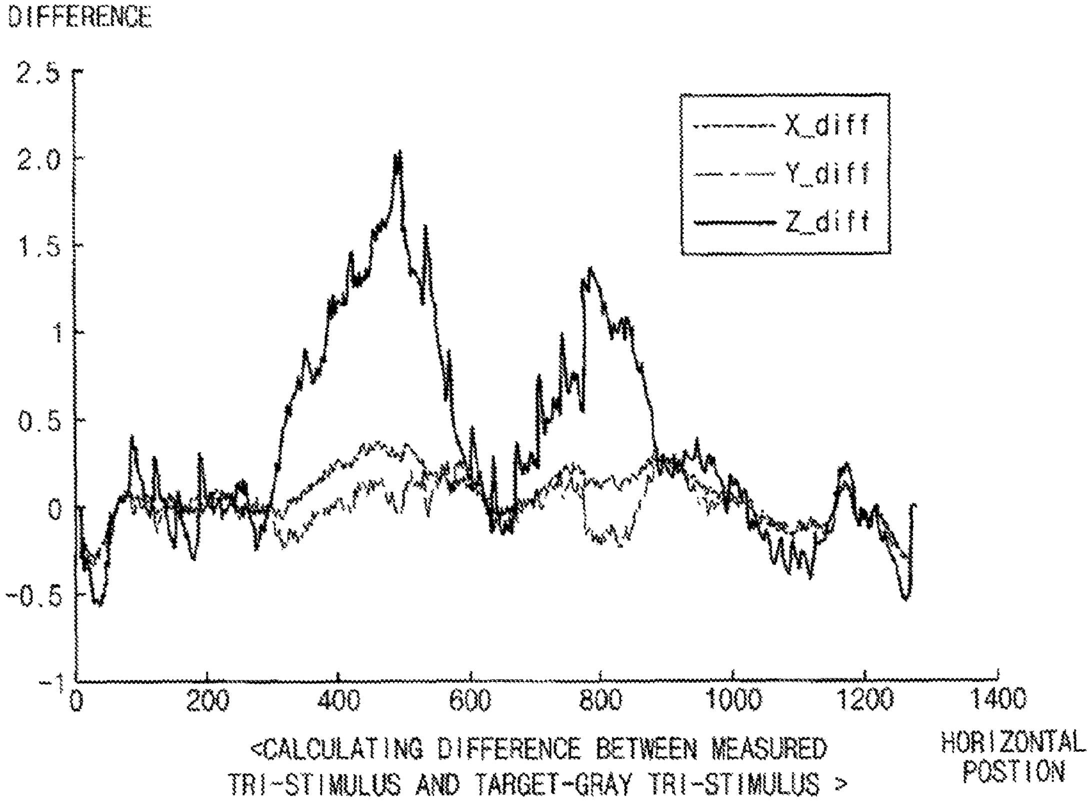
FIGS. 5A and 5B are conceptual graphical diagrams illustrating data from a RGB correction value generating part of FIG. 1.
Figure 5B:
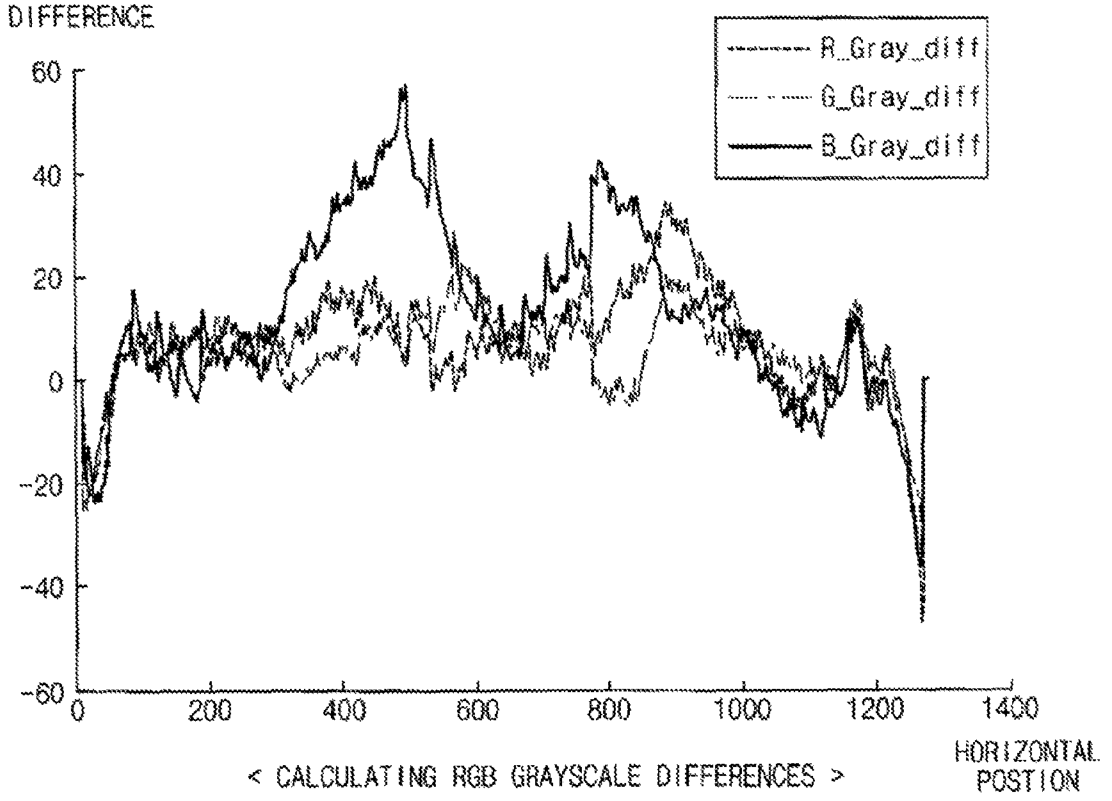

FIG. 2 is a flowchart illustrating a method of driving the vision inspection apparatus of FIG. 1. FIGS. 3A and 3B are conceptual diagrams illustrating exemplary data from a target tri-stimulus generating part of FIG. 1. FIGS. 4A to 4C are conceptual diagrams illustrating exemplary data from a tri-stimulus generating part of FIG. 1. FIGS. 5A and 5B are conceptual diagrams illustrating exemplary data from a RGB correction value generating part of FIG. 1.

Referring to FIGS. 1 and 2, the vision inspection apparatus 200 may be configured to calculate red, green and blue grayscale correction values of a sample grayscale corresponding to a reference pixel of the display apparatus 100 for compensating colored mura defects.

For example, the tri-stimulus measuring part 210 may be configured to measure gray tri-stimulus values XGray_n, YGray_n and ZGray_n of an n-grayscale, which is the sample grayscale, corresponding to the reference pixel from a gray image of the n-grayscale displayed on the display apparatus 100 (where 'n' is a natural number) (Step S210).

In addition, the tri-stimulus measuring part 210 may be configured to measure red tri-stimulus values XRed_255, YRed_255 and ZRed_255 of a 255-grayscale which may be the full-grayscale, corresponding to the red sub-pixel of the reference pixel from a red image of the 255-grayscale displayed on only red sub-pixels in the display apparatus 100. The tri-stimulus measuring part 210 may be configured to measure green tri-stimulus values XGreen_255, YGreen_255 and ZGreen_255 of the 255-grayscale corresponding to the green sub-pixel of the reference pixel from a green image of the 255-grayscale displayed on only green sub-pixels in the display apparatus 100. The tri-stimulus measuring part 210 may be configured to measure blue tri-stimulus values XBlue_255, YBlue_255 and ZBlue_255 of the 255-grayscale corresponding to the blue sub-pixel of the reference pixel from a blue image of the 255-grayscale displayed on only blue sub-pixels in the display apparatus 100 (Step S210).

The target tri-stimulus generating part 230 may be configured to generate target-gray tri-stimulus values XGray_n_target, YGray_n_target and ZGray_n_target of the n-grayscale using the gray tri-stimulus values XGray_n, YGray_n and ZGray_n of the n-grayscale corresponding to the reference pixel measured from the tri-stimulus measuring part 210 (Step S230).

Referring to FIGS. 3A and 3B, the target tri-stimulus generating part 230 may be configured to generate tri-stimulus curves using the gray tri-stimulus values of the sample grayscale respectively corresponding to a plurality of reference pixels included in the display apparatus 100.

For example, as shown in FIG. 3A, in the n-grayscale of the sample grayscale, an X-stimulus curve X_line is a curve in which average values of X-stimulus values corresponding to the reference pixels arranged in a vertical direction and located at a same horizontal position of the display apparatus 100 are indicated. A Y-stimulus curve Y_line is a curve in which average values of Y-stimulus values corresponding to the reference pixels arranged in a vertical direction and located at a same horizontal position of the display apparatus 100 are indicated. A Z-stimulus curve Z_line is a curve in which average values of Z-stimulus values corresponding to the reference pixels arranged in a vertical direction and located at a same horizontal position of the display apparatus 100 are indicated.

The target tri-stimulus generating part 230 may be configured to generate X, Y and Z target curves X_T_line, Y_T_line and Z_T_line based on the X, Y and Z-stimulus curves X_line, Y_line and Z_line. The target tri-stimulus generating part 230 may be configured to generate target-gray tri-stimulus values XGray_n_target, YGray_n_target and ZGray_n_target of the n-grayscale corresponding to the reference pixel.

The RGB tri-stimulus generating part 250 may be configured to calculate red tri-stimulus values XRed_n, YRed_n and ZRed_n, green tri-stimulus values XGreen_n, YGreen_n and ZGreen_n, and blue tri-stimulus values XBlue_n, YBlue_n and ZBlue_n of the n-grayscale using the RGB algorithm based on characteristics of the LCD panel (Step S250).

The RGB algorithm may include calculating red, green and blue color coordinates of the sample grayscale corresponding to the reference pixel using a representative function of differences between a color coordinate corresponding to the full-grayscale and the color coordinate corresponding to the sample grayscale with respect to a transmittance of an LCD panel, and calculating red, green and blue luminance values of the sample grayscale using a matrix equation of the red, green and blue color coordinates calculated from measured gray tri-stimulus values.

Referring to FIG. 4A, an x red curve R_x_diff indicates differences between an x value xRed_255 of the color coordinate corresponding to a red image of a 255-grayscale, which may be the full-grayscale, and an x value xRed_n of the color coordinate corresponding to a red image of an n-sample grayscale, which is the sample grayscale with respect to a transmittance of the LCD panel. An y red curve R_y_diff indicates differences between an y value yRed_255 of the color coordinate corresponding to the red image of the 255-grayscale and an y value yRed_n of the color coordinate corresponding to the red image of the n-sample grayscale. The RGB tri-stimulus generating part 250 may be configured to calculate the color coordinate xRed_n and yRed_n corresponding to the red image of the sample grayscale using the x red curve R_x_diff and the y red curve R_y_diff as shown in FIG. 4A.

The color coordinate xRed_n and yRed_n corresponding to the red image of the sample grayscale may be defined as the following Equation 1:

$$x_{Red\_n}=x_{Red\_255}-(x_{Red\_255}-x_{Red\_n})$$

$$y_{Red\_n}=y_{Red\_255}-(y_{Red\_255}-y_{Red\_n})$$

$$x_{Green\_n}=x_{Green\_255}-(x_{Green\_255}-x_{Green\_n})$$

$$y_{Green\_n}=y_{Green\_255}-(y_{Green\_255}-y_{Green\_n})$$

$$x_{Blue\_n}=x_{Blue\_255}-(x_{Blue\_255}-x_{Blue\_n})$$

$$y_{Blue\_n}=y_{Blue\_255}-(y_{Blue\_255}-y_{Blue\_n}) \quad \text{Equation 1}$$

Referring to FIG. 4B, an x green curve G_x_diff indicates differences between an x value xGreen_255 of the color coordinate corresponding to a green image of a 255-grayscale, which may be the full-grayscale, and an x value xGreen_n of the color coordinate corresponding to a Green image of an n-sample grayscale, which is the sample grayscale with respect to the transmittance of the LCD panel. A y green curve G_y_diff indicates differences between an y value yGreen_255 of the color coordinate corresponding to the green image of the 255-grayscale and an y value yGreen_n of the color coordinate corresponding to the green image of the n-sample grayscale with respect to the transmittance of the LCD panel. Per Equation 1, above, the RGB tri-stimulus generating part 250 may be configured to calculate the color coordinate xGreen_n and yGreen_n corresponding to the green image of the sample grayscale using the x green curve G_x_diff and the y green curve G_y_diff as shown in FIG. 4B.

Referring to FIG. 4C, x blue curve B_x_diff indicates differences between an x value xBlue_255 of the color coordinate corresponding to a blue image of a 255-grayscale, which may be the full-grayscale, and an x value xblue_n of the color coordinate corresponding to a blue image of an n-sample grayscale, which is the sample grayscale with respect to the transmittance of the LCD panel. A y blue curve B_y_diff indicates differences between a y value yBlue_255 of the color coordinate corresponding to the blue image of the 255-grayscale and a y value yBlue_n of the color coordinate corresponding to the blue image of the n-sample grayscale with respect to the transmittance of the LCD panel. Per Equation 1, above, the RGB tri-stimulus generating part 250 may be configured to calculate the color coordinate xBlue_n and yBlue_n corresponding to the blue image of the sample grayscale using the x blue curve B_x_diff and the y blue curve B_y_diff as shown in FIG. 4C.

The RGB tri-stimulus generating part 250 may be configured to change red, green and blue tri-stimulus values X, Y and Z into each of red, green and blue color coordinate x and y, and a luminance value Y, using a relational equation of the color coordinate x and y and the tri-stimulus values X, Y and Z in CIE 1931 color space as in the following Equation 2:

$$X = \frac{X}{Y} \times Y = \frac{x}{y} \times Y \quad Z = \frac{Z}{Y} \times Y = \frac{z}{y} \times Y \qquad \text{Equation 2}$$

The gray tri-stimulus values XGray_n, YGray_n and ZGray_n of the sample grayscale may be defined as a sum of the red, green and blue tri-stimulus values (XRed_n, YRed_n, ZRed_n), (XGreen_n, YGreen_n, ZGreen_n) and (XBlue_n, YBlue_n, ZBlue_n). The following Equation 3 may be defined by the Equation 2 and the sum.

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix} \begin{bmatrix} Y_{Red\_n} \\ Y_{Green\_n} \\ Y_{Blue\_n} \end{bmatrix} \qquad \text{Equation 3}$$

When an inverse matrix is applied to a matrix equation of Equation 3, the red, green and blue luminance values YRed_n, YRed_n and YBlue_n of the sample grayscale may be calculated with the following Equation 4:

$$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix} \qquad \text{Equation 4}$$

As described above, the RGB tri-stimulus generating part 250 may be configured to calculate red tri-stimulus values XRed_n, YRed_n and ZRed_n, green tri-stimulus values XGreen_n, YGreen_n and ZGreen_n and blue tri-stimulus values XBlue_n, YBlue_n and ZBlue_n of the sample grayscale corresponding to the reference pixel.

The RGB correction value generating part 270 may be configured to calculate red, green and blue grayscale correction values Δn_red, Δn_green and Δn_blue of the sample grayscale using the gray tri-stimulus values XGray_n, YGray_n and ZGray_n, the target-gray tri-stimulus values XGray_n_target, YGray_n_target and ZGray_n_target and the red, green and blue tri-stimulus values (XRed_n, YRed_n, ZRed_n), (XGreen_n, YGreen_n, ZGreen_n) and (XBlue_n, YBlue_n, ZBlue_n) of the sample grayscale. The gray tri-stimulus values XGray_n, YGray_n and ZGray_n are measured from the tri-stimulus measuring part 210. The target-gray tri-stimulus values XGray_n_target, YGray_n_target and ZGray_n_target are generated from the target tri-stimulus generating part 230. The red, green and blue tri-stimulus values (XRed_n, YRed_n, ZRed_n), (XGreen_n, YGreen_n, ZGreen_n) and (XBlue_n, YBlue_n, ZBlue_n), respectively, are generated from the RGB tri-stimulus generating part 250 (Step S270).

For example, the RGB correction value generating part 270 may be configured to calculated the red, green and blue grayscale correction values Δn_red, Δn_green and Δn_blue of the sample grayscale corresponding to the reference pixel as in the following Equation 5:

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} \qquad \text{Equation 5}$$

$$\begin{bmatrix} X_{Gray\_n\_target} \\ Y_{Gray\_n\_target} \\ Z_{Gray\_n\_target} \end{bmatrix} = \begin{bmatrix} X_{Red\_(n+\Delta n\_red)} + X_{Green\_(n+\Delta n\_green)} + X_{Blue\_(n+\Delta n\_blue)} \\ Y_{Red\_(n+\Delta n\_red)} + Y_{Green\_(n+\Delta n\_green)} + Y_{Blue\_(n+\Delta n\_blue)} \\ Z_{Red\_(n+\Delta n\_red)} + Z_{Green\_(n+\Delta n\_green)} + Z_{Blue\_(n+\Delta n\_blue)} \end{bmatrix}$$

FIG. 5A is difference curves X_diff, Y_diff and Z_diff indicating differences between target-gray tri-stimulus values XGray_n_target, YGray_n_target and ZGray_n_target and gray tri-stimulus values XGray_n, YGray_n and ZGray_n of the sample grayscale. FIG. 5B grayscale difference curves R_Gray_diff, G_Gray_diff and B_Gray_diff indicating grayscale differences of the red, green and blue grayscales of the sample grayscale based on the difference curves X_diff, Y_diff and Z_diff as shown in FIG. 5A.

The RGB correction value generating part 270 may be configured to calculate the red, green and blue grayscale correction value Δn_red, Δn_green and Δn_blue based on the grayscale differences of the red, green and blue grayscale corresponding to the sample grayscale.

The storing part 290 may be configured to the red, green and blue grayscale correction values Δn_red, Δn_green and Δn_blue calculated from the RGB correction value generating part 270 (Step S290).

As described above, according to exemplary embodiments, the red, green and blue tri-stimulus values of the sample grayscale may be calculated by the RGB algorithm and need not generated by a visual measurement processes. Thus, inspection processing times for compensating colored mura defects may be low.

The foregoing is illustrative of the inventive concept and is not to be construed as limiting thereof. Although exemplary embodiments of the inventive concept have been described, those of ordinary skill in the pertinent art will readily appreciate that many modifications are possible in the exemplary embodiments without materially departing from the novel teachings of the inventive concept. Accordingly, all such modifications are intended to be included within the scope of the inventive concept as defined in the appended claims. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A vision inspection apparatus comprising:

a tri-stimulus measuring part configured to measure gray tri-stimulus values of a sample grayscale and color tri-stimulus values of a full-grayscale;

a color tri-stimulus generating part configured to generate color tri stimulus values of the sample grayscale using the gray tri-stimulus values of the sample grayscale and the color tri-stimulus values of the full-grayscale; and a color correction value generating part configured to generate a color grayscale correction value using the gray tri-stimulus values of the sample grayscale and the color td-stimulus values of the sample grayscale.

2. The vision inspection apparatus of claim 1, wherein the color tri-stimulus generating part is configured to calculate a color coordinate corresponding to the sample grayscale using a representative function of differences between a color coordinate corresponding to the full-grayscale and the color coordinate corresponding to the sample grayscale with respect to a transmittance of a display panel.

3. The vision inspection apparatus of claim 2, wherein the color tri-stimulus generating part is configured to calculate a color luminance value corresponding to the sample grayscale using a relational equation of the color tri-stimulus values and the color coordinate corresponding to the sample grayscale.

4. The vision inspection apparatus of claim 3, wherein the color tri-stimulus generating part is configured to generate the color tri-stimulus values corresponding to the sample grayscale using the color coordinate and the color luminance value corresponding to the sample grayscale.

5. The vision inspection apparatus of claim 2, wherein a red color coordinate (xRed_n, yRed_n) corresponding to the sample grayscale, a green color coordinate (xGreen_n, yGreen_n) corresponding to the sample grayscale and a blue color coordinate (xBlue_n, yBlue_n) corresponding to the sample grayscale are defined as following;

$$x_{Red\_n}=x_{Red\_255}-(x_{Red\_255}-x_{Red\_n})$$

$$y_{Red\_n}=y_{Red\_255}-(y_{Red\_255}-y_{Red\_n})$$

$$x_{Green\_n}=x_{Green\_255}-(x_{Green\_255}-x_{Green\_n})$$

$$y_{Green\_n}=y_{Green\_255}-(y_{Green\_255}-y_{Green\_n})$$

$$x_{Blue\_n}=x_{Blue\_255}-(x_{Blue\_255}-x_{Blue\_n})$$

$$y_{Blue\_n}=y_{Blue\_255}-(y_{Blue\_255}-y_{Blue\_n})$$

wherein, $(x_{Red\_255}-x_{Red\_n})$, $(y_{Red\_255}-y_{Red\_n})$, $(x_{Green\_255}-x_{Green\_n})$, $(y_{Green\_255}-y_{Green\_n})$, $(x_{Blue\_255}-x_{Blue\_n})$ and $(y_{Blue\_255}-y_{Blue\_n})$ are calculated by the representative function, and a red color coordinate (xRed_255, yRed_255) corresponding to the full-grayscale, a green color coordinate (xGreen_255, yGreen_255) corresponding to the full-grayscale, and a blue color coordinate (XBlue_255, yBlue_255) corresponding to the full-grayscale are defined by the following relational equation with respect to tri-stimulus values X, Y and Z and color coordinates x and y;

$$X=\frac{X}{Y}\times Y=\frac{x}{y}\times Y\ Z=\frac{Z}{Y}\times Y=\frac{z}{y}\times Y.$$

6. The vision inspection apparatus of claim 5, wherein red, green and blue luminance values (YRed_n, YGren_n, YBlue_n) corresponding to the sample grayscale are defined as following Equations;

$$\begin{bmatrix} X_{Gray\_n} \\ Y_{Gray\_n} \\ Z_{Gray\_n} \end{bmatrix} = \begin{bmatrix} X_{Red\_n}+X_{Green\_n}+X_{Blue\_n} \\ Y_{Red\_n}+Y_{Green\_n}+Y_{Blue\_n} \\ Z_{Red\_n}+Z_{Green\_n}+Z_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix} \begin{bmatrix} Y_{Red\_n} \\ Y_{Green\_n} \\ Y_{Blue\_n} \end{bmatrix}$$

$$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix}$$

wherein XGray_n, YGray_n and ZGray_n are the gray tri-stimulus values corresponding to the sample grayscale.

7. The vision inspection apparatus of claim 1, further comprising:

a target tri-stimulus generating part configured to generate target-gray tri-stimulus values of the sample grayscale using the gray tri-stimulus values of the sample grayscale, wherein the color correction value generating part is configured to generate the color grayscale correction value of the sample grayscale using the target-gray tri-stimulus values, the gray tri-stimulus values and the color tri-stimulus values corresponding to the sample grayscale.

8. A method of driving a vision inspection apparatus comprising:

measuring gray tri-stimulus values of a sample grayscale and color tri-stimulus values of a full-grayscale;

generating color tri stimulus values of the sample grayscale using the gray tri-stimulus values of the sample grayscale and the color tri-stimulus values of the full-grayscale; and calculating a color grayscale correction value using the gray tri-stimulus values of the sample grayscale and the color tri-stimulus values of the sample grayscale.

9. The method of claim 8, wherein the generating color tri-stimulus values comprising;

calculating a color coordinate corresponding to the sample grayscale using a representative function of differences between a color coordinate corresponding to the full-grayscale and the color coordinate corresponding to the sample grayscale with respect to a transmittance of a display panel.

10. The method of claim 9, further comprising;

calculating a color luminance value corresponding to the sample grayscale using a relational equation of the color tri-stimulus values and the color coordinate corresponding to the sample grayscale.

11. The method of claim 10, further comprising;

generating the color tri-stimulus values corresponding to the sample grayscale using the color coordinate and the color luminance value corresponding to the sample grayscale.

12. The method of claim 9, wherein a red color coordinate (xRed_n, yRed_n) corresponding to the sample grayscale, a green color coordinate (xGreen_n, yGreen_n) corresponding to the sample grayscale and a blue color coordinate (xBlue_n, yBlue_n) corresponding to the sample grayscale are defined as following;

$$x_{Red\_n}=x_{Red\_255}-(x_{Red\_255}-x_{Red\_n})$$

$$y_{Red\_n}=y_{Red\_255}-(y_{Red\_255}-y_{Red\_n})$$

$$x_{Green\_n}=x_{Green\_255}-(x_{Green\_255}-x_{Green\_n})$$

$$y_{Green\_n}=y_{Green\_255}-(y_{Green\_255}-y_{Green\_n})$$

$$x_{Blue\_n}=x_{Blue\_255}-(x_{Blue\_255}-x_{Blue\_n})$$

$$y_{Blue\_n}=y_{Blue\_255}-(y_{Blue\_255}-y_{Blue\_n})$$

wherein, $(x_{Red\_255}-x_{Red\_n})$, $(y_{Red\_255}-y_{Red\_n})$, $(x_{Green\_255}-x_{Green\_n})$, $(y_{Green\_255}-y_{Green\_n})$, $(x_{Blue\_255}-x_{Blue\_n})$ and $(y_{Blue\_255}-y_{Blue\_n})$ are calculated by the representative function, and a red color coordinate (xRed_255, yRed_255) corresponding to the full-grayscale, a green color coordinate (xGreen_255, yGreen_255) corresponding to the full-grayscale, and a blue color coordinate (xBlue_255, yBlue_255) corresponding to the full-grayscale are defined by the following relational equation with respect to tri-stimulus values X, Y and Z and color coordinates x and y;

$$X = \frac{X}{Y} \times Y = \frac{x}{y} \times Y \; Z = \frac{Z}{Y} \times Y = \frac{z}{y} \times Y.$$

13. The method of claim 12, wherein red, green and blue luminance values (YRed_n, YGren_n, YBlue_n) corresponding to the sample grayscale are defined as following Equations;

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix} \begin{bmatrix} Y_{Red\_n} \\ Y_{Green\_n} \\ Y_{Blue\_n} \end{bmatrix}$$

$$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix}$$

wherein XGray_n, YGray_n and ZGray_n are the gray tri-stimulus values corresponding to the sample grayscale.

14. The method of claim 8, further comprising:

generating target-gray tri-stimulus values of the sample grayscale using the gray tri-stimulus values of the sample grayscale; and generating the color grayscale correction value of the sample grayscale using the target-gray tri-stimulus values, the gray tri-stimulus values and the color tri-stimulus values corresponding to the sample grayscale.

* * * * *